United States Patent [19]

Schäty

[11] 4,450,605
[45] May 29, 1984

[54] PIPE CLIP

[75] Inventor: Harald Schäty, Wetzlar, Fed. Rep. of Germany

[73] Assignee: USM Corporation, Farmington, Conn.

[21] Appl. No.: 374,095

[22] Filed: May 3, 1982

[30] Foreign Application Priority Data

May 6, 1981 [DE] Fed. Rep. of Germany ....... 3117913

[51] Int. Cl.³ .......................... F16L 3/08; A44B 21/00
[52] U.S. Cl. .................................... 24/457; 24/129 R; 24/485; 24/545; 248/74.3
[58] Field of Search ......... 24/255 R, 255 BS, 255 SL, 24/256, 257, 259 R, 129 R, 129 B, 249 R; 248/74.1, 74.3, 74.4, 74.5, 74.7, 74.8, 73

[56] References Cited

U.S. PATENT DOCUMENTS

| 3,944,177 | 3/1976 | Yoda | 248/73 |
| 4,195,807 | 4/1980 | Llauge | 248/74.3 |
| 4,213,589 | 7/1980 | Pierron et al. | 248/74.1 |

FOREIGN PATENT DOCUMENTS 2908120  9/1980  Fed. Rep. of Germany ..... 248/74.3

Primary Examiner—Gene Mancene
Assistant Examiner—David L. Tarnoff
Attorney, Agent, or Firm—Aubrey C. Brine

[57] ABSTRACT

A plastic pipe clip is adapted for attachment to a threaded weld stud and has means for receiving one or more pipes. Each pipe can be easily mounted in the clip without risk of damage due to the yielding of a resilient arm which, after receiving the pipe and embracing it, is locked against opening should the pipe be accidentally pulled away.

7 Claims, 4 Drawing Figures

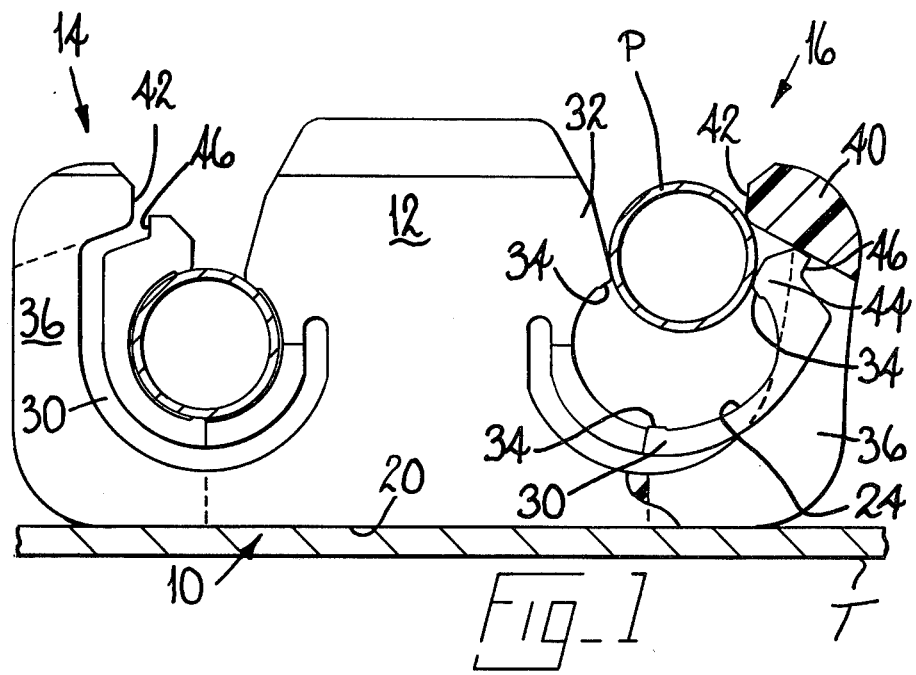
Fig_1
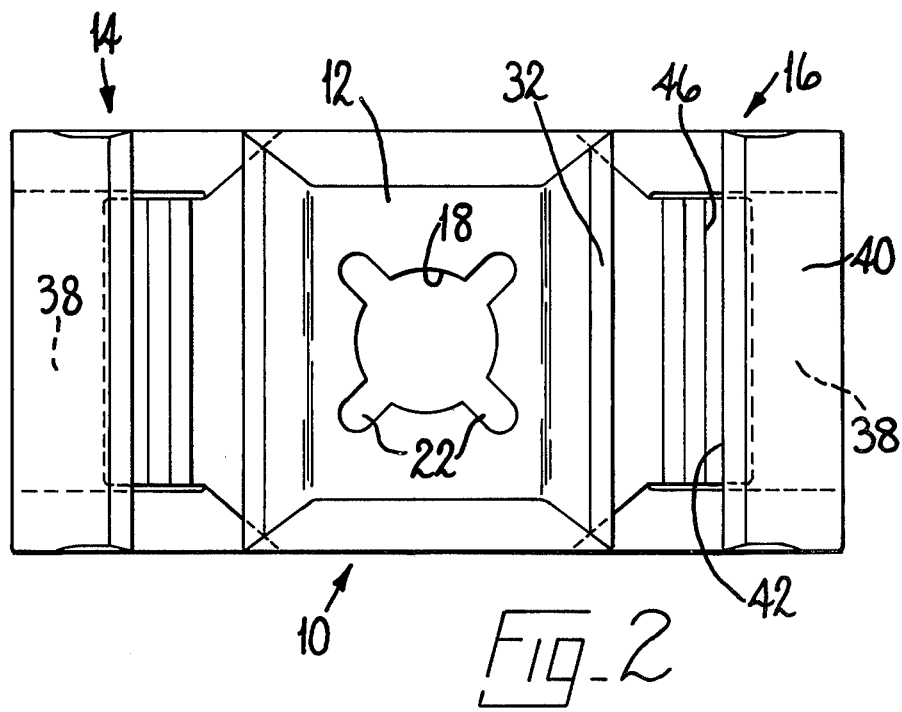
Fig_2

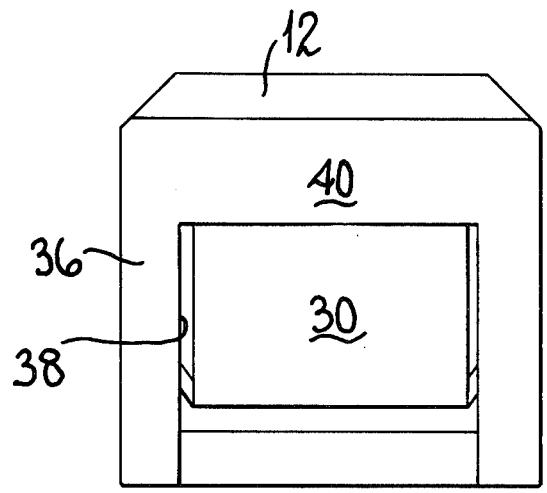
Fig_3
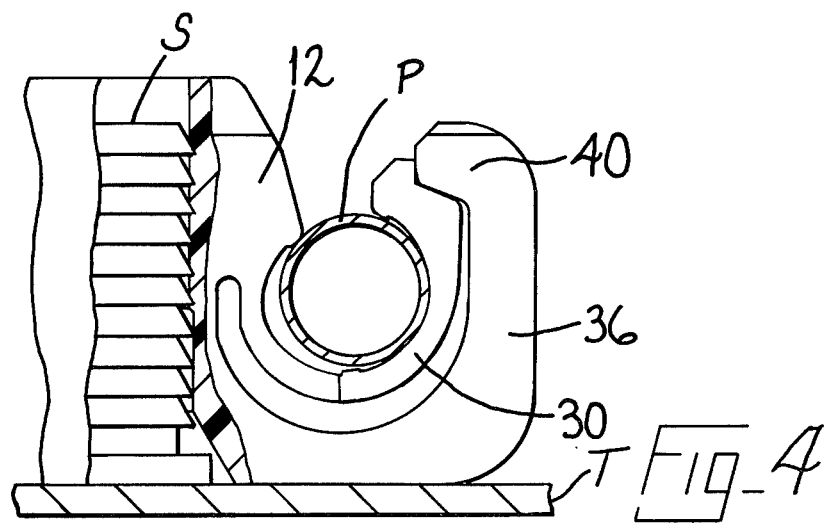
Fig_4

PIPE CLIP

BACKGROUND OF THE INVENTION

This invention is concerned with pipe clips made of plastic and more particularly to a clip comprising a body portion having means to enable the clip to be fixed to the support and an arcuate flexible and resilient pipe-receiving arm extending from the body portion and arranged together with the body portion to provide a seat which embraces the pipe around more than 180° of its circumference, there being a gap between the body portion and the free end of the arm through which, upon yielding of the arm, the pipe can be introduced to the seat.

Whereas the invention will be described with reference to clips used to secure piping, the term "pipe clip" is to be understood as embracing clips for use in holding elongated articles generally, including electrical cables.

Pipe clips of the aforementioned type are commonly used in the automobile industry to secure brake fluid and other pipe lines, and it is important that the clips can allow the pipes to be inserted without undue pressure, which, in the case of plastic pipes, might damage the pipes, and yet be able to resist disconnection if accidentally pulled. It is also important that the clips can easily be secured to their supports and that they are economical to manufacture.

An example of a pipe clip designed to allow easy insertion of a pipe, but strongly to resist withdrawal of the pipe from the clip, is described in German Published Application Offenlegungsschrift No. 2740376. The clip there described is one with one or two pivoted arms displaced by the pipe on insertion of the clip and resisting displacement to release the clip by frictional engagement of a curved wall of the arm or arms against a similarly curved wall of the clip body. The clip, thus, does not provide a positive lock against withdrawal of the pipe if it is accidentally pulled in a direction away from the support.

It is an object of the present invention to provide an improved, one-piece, plastic clip which is economical to manufacture, easy to install, and which provides secure retention of a pipe without undue force having to be used to insert it.

SUMMARY OF THE INVENTION

The foregoing object is achieved in accordance with the invention in that the plastic pipe clip has a second more rigid arm projecting from the body portion around the outside of the flexible arm, the more rigid arm terminating at an abutment surface close to the free end of the flexible arm and being so shaped as to allow the flexible arm to open without interference from the more rigid arm when a pipe is pushed into the clip and the flexible arm pressed towards the support and to prevent opening of the flexible arm by engagement of a shoulder at the free end of the flexible arm with the abutment surface if a pipe held by the clip is pulled in a direction away from the support.

Preferably, in a clip in accordance with the invention, the more rigid arm has an aperture to receive a flexible arm when the flexible arm is opened to allow admission of the pipe. The flexible arm may join the body at a locality spaced more than 180° round the seat from the free end of the arm.

A clip in accordance with the invention may have two or more flexible arms and a corresponding number of more rigid ones, and if it has two sets of arms, the arms of one pair may be arranged symmetrically opposite the others about an axis of the body portion, and the body portion may have a bore adapted to be secured to a stud upstanding from the support. The body portion may be rectangular as viewed in plan with a central pillar in which is the bore, the more rigid arms, if there are two, upstanding from ends of the body portion and having upper portions which constitute cross pieces and provide the abutment surfaces, the flexible arms generating from the pillar.

Preferably also, the flexible arms are of less width than the body portion of the clip, and the more rigid arms extend across the full width of the body portion and have apertures wider than the flexible arms so that the flexible arms, on insertion of the pipes, can open into them.

BRIEF DESCRIPTION OF THE DRAWING

There now follows a description, to be read with reference to the accompanying drawings, of a pipe clip embodying the invention and illustrative thereof by way of example.

In the drawings:

FIG. 1 is a view of the illustrative clip, one of two pipe-holding portions being shown partly in section with a pipe being inserted into it;

FIG. 2 is a plan view of the illustrative clip;

FIG. 3 is an end view of the illustrative clip; and

FIG. 4 is a view in elevation of the pipe-holding portion shown at the right of FIG. 1, but with a pipe-embracing arm of the clip shown in a locked condition, and assuming an attempt is made to pull the pipe out.

DESCRIPTION OF THE PREFERRED EMBODIMENT

The illustrative pipe clip comprises a body portion 10 which is rectangular as viewed in plan (FIG. 2) and has a central upstanding pillar 12 and two pipe-holding portions 14, 16 symmetrically disposed on either side of the piller. The portions 14, 16 are similar and therefore only one portion will be described in detail. The piller 12 has a bore 18 normal to a flat under-surface 20 of the body portion and the bore 18 has four longitudinal grooves 22 in its wall, enabling it to be assembled on a stud S (FIG. 4) with a screw thread or annular ridge and groove formation.

A seat 24 for a pipe P is provided in the portion 16 by an arcuate flexible and resilient arm 30 and an adjacent part 32 of the pillar 12 from which the arm 30 generates. The part 32 and arm 30 provide three transverse ridges 34 for engagement lengthwise of the pipe. Where it joins the pillar 12, the arm 30 is the full width of the body portion, but it initially tapers down to a smaller width.

The body portion 10 is spaced from the arm 30 adjacent the pillar and extends round the outside of the arm 30 to provide a more rigid arm to bridge-piece 36 the full width of the body portion and having an aperture 38 wider than the less wide part of the arm 30, and able to accommodate the arm 30 when it opens to receive a pipe. A cross piece 40 extends across the top of the arm 36 and provides an abutment surface 42. The flexible arm 30 terminates at a free end portion 44 near the cross piece 40, and provides an L-shaped, or stepped, shoulder 46 for engagement with the abutment surface 42 as will be described hereinafter.

The illustrative clip can easily be assembled on a stud S (FIG. 4) welded (for example) to a support T and a pipe P inserted into the seat 24 of a pipe-holding portion 16. Insertion of the pipe P is represented at the right hand side of FIG. 1 where it will be seen that, as the pipe is pushed towards the support T, the arm 30 opens to receive it, the end portion 44 being accommodated in the aperture 38 of the arm 36. The pipe thus assumes the condition shown at the left hand side of FIG. 1. Such insertion, involving the opening of the relatively flexible arm 30 and only slight deflection of the more rigid arm 36, does not call for undue pressure on the pipe P, which is thus not at risk of being damaged.

However, if from its seated position shown at the left hand side of FIG. 1 the pipe P is pulled in a direction away from the support T, the L-shaped shoulder 46 engages the abutment surface 42 before the arm 30 has opened significantly and locks the pipe against withdrawal. This condition is shown in FIG. 4.

Thus, although little force is necessary to assemble a pipe P in the illustrative clip, the pipe is positively locked against accidental withdrawal. The pipe P, however, can readily be released if desired by first pushing the free end of the arm 30 under the cross piece 40 by means of a screwdriver, or other convenient tool, so that opening of the arm is no longer prevented by the abutment surface 42.

The illustrative clip is made of nylon or polyacetal resin, but any other suitable resilient thermoplastics resin may be used. Further, the clip can be manufactured economically, by injection molding.

I claim:

1. A plastic pipe clip comprising a body portion having means to enable the clip to be fixed to a support and an arcuate flexible and resilient pipe-receiving arm extending from the body portion and arranged together with the body portion to provide a seat which embraces the pipe round more than 180° of its circumference, there being a gap between the body portion and the free end of the arm through which, upon yielding of the arm, the pipe can be introduced to the seat, and a second more rigid arm projecting from the body portion and round the outside of the flexible arm terminating at an abutment surface disposed thereon close to the free end of the flexible arm, the more rigid arm being so shaped as to allow the flexible arm to open without interference from the more rigid arm when a pipe is pushed into the clip and the flexible arm pressed towards the support, and to prevent opening of the flexibly arm by engagement of a shoulder at the free end of the flexible arm with the abutment surface, when a pipe held by the clip is pulled in a direction away from the support.

2. A clip according to claim 1 further characterized in that most of the flexible arm is of less width than the body portion, the more rigid arm extending across the full width of the body portion and having an aperture that is wider than the flexible arm such that the flexible arm, on insertion of the pipe, can open into it.

3. A clip according to claim 1 further characterized in that the flexible arm joins the body at a locality spaced more than 180° round the seat from the free end of the arm.

4. A clip according to claim 1 further characterized in that it has a pair of flexible arms and a pair of more rigid ones, the arms of one pair being arranged symmetrically opposite the others about an axis of the body portion.

5. A clip according to claim 4 further characterized in that the body portion has a bore concentric with said axis and is adapted thereby to be secured to a stud upstanding from the support.

6. A clip according to claim 1 further characterized in that the body portion is rectangular as viewed in plan with a central pillar in which is the bore, the more rigid arms upstanding from ends of the body portion and having upper portions which constitute cross pieces and provide said abutment surfaces, the flexible arms generating from said pillar.

7. A plastic pipe clip comprising a body portion having means to enable the clip to be fixed to a support and an arcuate flexible and resilient pipe-receiving arm extending from the body portion and arranged together with the body portion to provide a seat which embraces the pipe round more than 180° of its circumference, there being a gap between the body portion and the free end of the arm through which, upon yielding of the arm the pipe can be introduced to the seat, and a second more rigid arm projecting from the body portion and round the ouside of the flexible arm characterized in that the more rigid arm is wider, in the lengthwise direction of a pipe held in the flexible arm, than the flexible arm and has an aperture to receive the flexible arm when the flexible arm is opened to allow admission of the pipe, and in that at its free end the flexible arm has a stepped portion which provides a shoulder arranged to prevent opening of the flexible arm, when a pipe held by the clip is pulled in a direction away from the support, by engagement with an abutment surface of a cross piece of the more rigid arm overlying the aperture.

* * * * *